(No Model.)
N. O. PYLES.
BLOTTER.
No. 308,378. Patented Nov. 25, 1884.
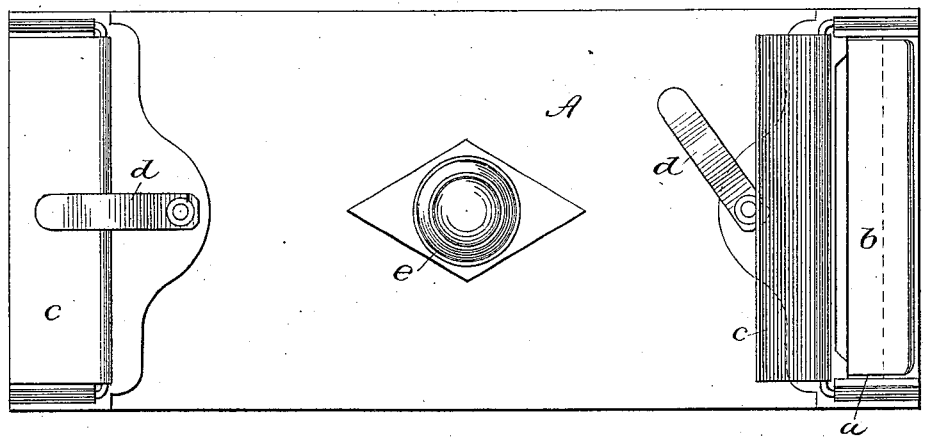
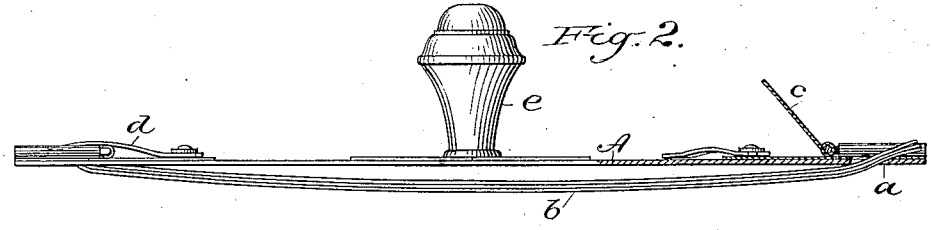
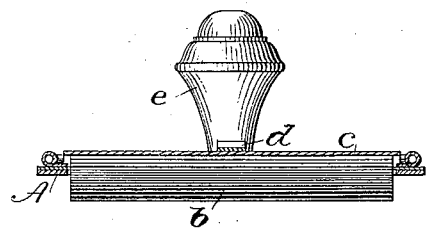
Witnesses:
H. C. Jones
R. D. Johnston
Inventor:
Newton O. Pyles
By Thos. M. Pittman,
Attorney.

UNITED STATES PATENT OFFICE.

NEWTON O. PYLES, OF CORONACO, SOUTH CAROLINA.

BLOTTER.

SPECIFICATION forming part of Letters Patent No. 308,378, dated November 25, 1884.

Application filed April 30, 1884. (No model.)

*To all whom it may concern:*

Be it known that I, NEWTON O. PYLES, of Coronaco, in the county of Abbeville, State of South Carolina, have invented a new and useful Improvement in Blotters, to be used in connection with blotter covered by Letters Patent No. 290,668, dated December 25, 1883, and issued to James Q. Davis and Newton O. Pyles; and I do hereby declare that the following is a full, clear, and exact description of the invention, which will enable others skilled in the art to which it appertains to make and use the same.

Figure 1 is a top view of the invention; Fig. 2, a longitudinal sectional view, and Fig. 3 a cross-sectional view.

The drawings show the blotter complete with my improvement attached.

I take a thin metal plate, A, Fig. 1—say about ten inches long and three inches wide, larger or smaller, if desired. Across this plate, near each end, is a narrow slot, $a$, through which the ends of the blotting-paper $b$ are inserted from the lower side, as shown in Fig. 2. Near each of these slots, and extending across plate A, is a hinge-plate, $c$, which closes down on the end of the blotting-paper, holding it securely in place. This plate $c$ is held down by a spring, $d$, which being turned to one side releases the hinge-plate, which in turn releases the blotting-paper when desired.

In the center of plate A is a small knob-handle, $e$.

I claim as my invention and desire to secure by Letters Patent—

In combination with the end-slotted plate or holder, the hinged plate and spring, arranged and adapted for use substantially as shown and set forth.

NEWTON O. PYLES.

Witnesses:
T. R. ROBERTSON,
R. D. JOHNSTON.